Aug. 23, 1966     A. R. PUCCINELLI     3,268,883
ICE DETECTOR MEANS

Filed March 4, 1964             2 Sheets-Sheet 1

INVENTOR.
ALFRED R. PUCCINELLI
BY James P. Malone

Aug. 23, 1966 A. R. PUCCINELLI 3,268,883
ICE DETECTOR MEANS
Filed March 4, 1964 2 Sheets-Sheet 2

INVENTOR.
ALFRED R. PUCCINELLI
BY James P. Malone

United States Patent Office 3,268,883
Patented August 23, 1966

3,268,883
ICE DETECTOR MEANS
Alfred R. Puccinelli, 36 Bay Drive E.,
Huntington, L.I., N.Y.
Filed Mar. 4, 1964, Ser. No. 349,373
8 Claims. (Cl. 340—234)

This invention relates to ice and smoke detecting means and more particularly to means for detecting icing conditions in a carburetor of an internal combustion engine.

It is well known that ice forms readily in the carburetor systems of internal combustion engines and it is also well known that in helicopters and airplanes this reduces or cuts the engine power and creates a very hazardous condition. Ice may be formed in the carburetor by several different processes, for instance sleet, snow and sub-cooled rain or saturated or moist air may cause the formation of ice in a carburetor or on other surfaces of an aircraft.

Ice is also formed in a carburetor when the outside air temperature is above freezing and the relative humidity is high. It is also formed in a carburetor system by fuel evaporation after the fuel is introduced into the air stream which causes moisture to condense and freeze on the inside walls of the carburetor.

The result of ice forming in a carburetor is the cutting down of the engine power and results in a hazardous condition. It is, therefore, very important that icing conditions be readily and quickly detected. Icing on wings or control surfaces can also be detected by the present invention. It may also be used to detect smoke or fluid.

Accordingly, a principal object of the invention is to provide new and improved means for detecting icing.

Another object of the invention is to provide new and improved means for detecting icing in carburetors in internal combustion engines.

Another object of the invention is to provide new and improved means for detecting icing in aircraft carburetors.

Another object of the invention is to provide new and improved means for detecting icing on aircraft surfaces and in air ducts.

Another object of the invention is to provide new and improved carburetor ice detector means comprising a probe adapted to be mounted in a wall of a carburetor to extend into said carburetor, a light sensitive switch mounted at one end of said probe, a light source mounted in said probe and adapted to cast a light beam upon said switch, and warning means responsive to said light sensitive switch whereby when said light beam is cut off from said switch by ice, said warning means will be activated.

Another object of the invention is to detect smoke due to fire or the presence of liquids.

These and other objects of the invention will be apparent from the following specification and drawings of which:

The present invention generally provides a probe which may be inserted in a tapped hole in the wall of a carburetor throat. The probe incorporates a light source and a solid state light sensitive electric switch which is mounted at the end of the probe so that it receives the light through a predetermined path from the light source. The switch will conduct an electric current in the presence of light from the light source. However, if ice or frost is built up to a predetermined amount on the wall of the carburetor in the light path between the light source and the switch in the probe, then the switch will not conduct current and suitable warning devices are activated.

Figure 1:
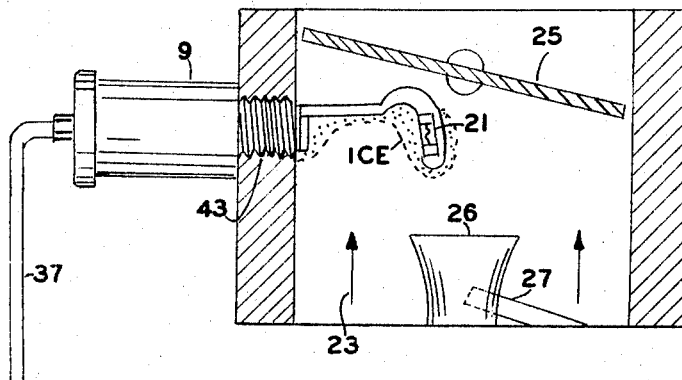
FIGURE 1 is a cross-sectional view of a carburetor with the probe of the present invention installed.

Referring to the figures, FIGURE 1 shows a cross-sectional view of the throat of a carburetor. A probe 9 is inserted in one wall of the carburetor through a tapped aperture 43. The carburetor 11 is a conventional updraft carburetor having air flow indicated by arrow 23, and has a throttle valve 25, venturi tube 26, and fuel jet 27.

Figure 4:
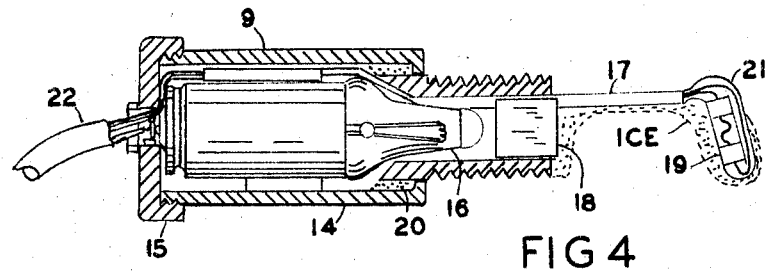
FIGURE 4 is an enlarged detail view of the probe of the present invention.

The probe, for best efficiency sensitivity and reaction time should be in the airstream, FIGURE 4, and comprises a body member 14 which contains a light or other radiation source 16 which is adapted to direct a path of light to a light sensitive switch 19 which is mounted at the end 21 of the probe member 17. The light path passes through a Plexiglas or glass window 18 which terminates within the inside wall of the carburetor. The base 15 connected to the body 14 provides a center contract for the light source, which is connected to wire of the cable 22. The other two wires of cable 22 are connected to the switch 19.

The light switch is a small conventional silicon semiconductor switch 19 for instance type International Rectifier Co. SL1S1 or General Electric ZJ227U which is adapted to conduct in the presence of the light path. Conventional photo-cells are not suitable for the present purpose since the device must be very small and be able to withstand extreme temperature variation and vibration loads and shock. The light switch must also be capable of activating a relay directly without the need for means to amplify the electrical power needed by weaker photo-cells. The light switch is also glass sealed and impervious to gasoline, oil, etc.

The level of the illumination is carefully adjusted so that when ice starts to form on the inside wall and probe of the carburetor as shown by the dotted lines, the light path will be reduced or cut off and the switch will activate suitable warning devices which may be a red warning light.

Figure 2:
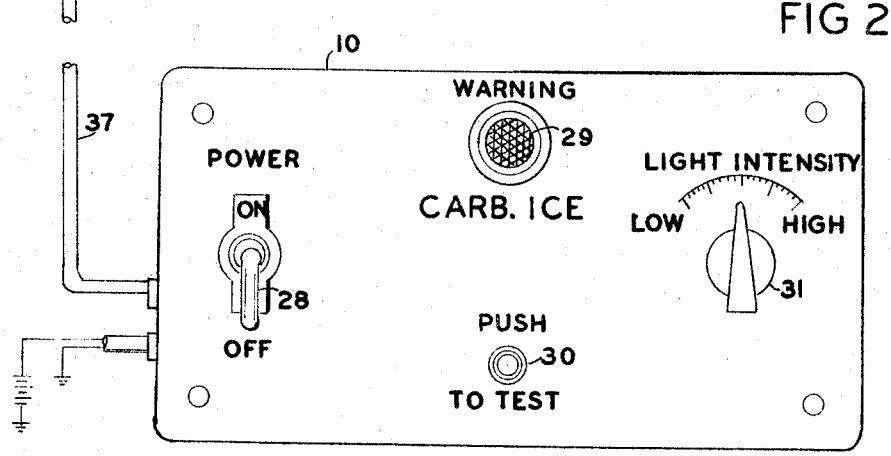
FIGURE 2 is a front view of the control panel of the present invention.
Figure 3:
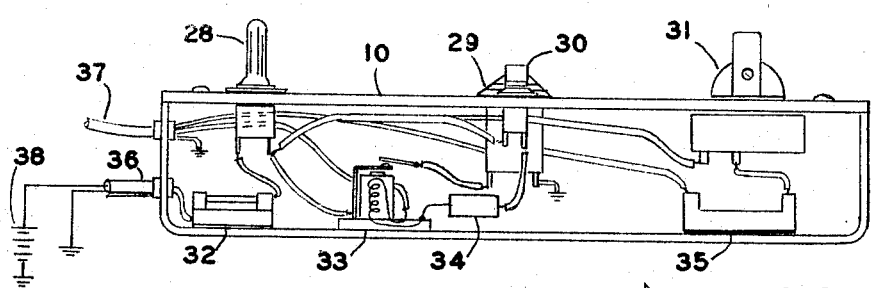
FIGURE 3 is a side view of the control panel of FIGURE 2 with one side removed.
Figure 3A:
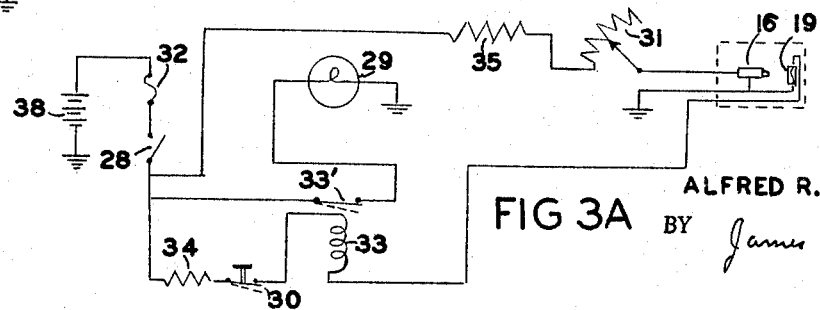
FIGURE 3A is a schematic circuit diagram of FIGURE 3.

FIGURES 2 and 3 show top and side views of the control panel of the invention. FIGURE 3A shows a schematic circuit diagram. The control panel has a power switch 28, a warning light device 29, a pushbutton switch 30, and a light intensity adjustment 31.

A source of voltage 38, for instance the 12 volt battery on an aircraft, is connected via the fuse 32 through power switch 28, resistor 34, and pushbutton switch 30 to a relay coil 33. The normally closed relay contacts 33' connect a source of voltage from the power switch to the warning light 29. Probe 9 has a light source 16 and the light sensitive switch 19. The light sensitive switch is connected from ground to one end of the relay coil 33. The light source 16 is connected from ground through the light intensity adjustment potentiometer 31 via the resistor 35 back to the power source through the power switch 28.

The operation of the device and circuit is as follows:

With the power switch 28 connected, when the normally closed pushbutton switch 30 is not pressed, the circuit would be completed via the pushbutton 30, relay coil 33, and switch 19.

The contacts 33' are normally closed and they are opened by the coil 33, and the pushbutton is normally closed. Therefore, when there is no ice, the circuit is normally completed through the switch 19 and the coil 33 which holds the contacts 33' open. When there is an icing condition, the switch 19 does not conduct, the circuit through the relay 33 is broken, the contacts 33' close to light the warning light 29.

The pushbutton 30 is provided in the circuit in order to test the operation of the warning light and relay and to unlatch the light switch. The particular light switch, for instance of the PNPN type used will not be opened or "unlatched" by the stopping of the light beam alone. This is believed due to a temperature phenomenon in the device. When the pushbutton is pressed, the warning light 29 should go on. When the pushbutton is released if the warning light 29 stays on, then an icing condition is indicated. The D.C. circuit through the light switch must be interrupted to allow the light switch to open up if the light is blocked by ice.

The light intensity is adjusted by means of the potentiometer 31 to cause the operation of the switch at a predetermined icing condition. The potentiometer 31 is preferably adjusted by turning down the light intensity of the light source 16 until the switch 19 just operates. Therefore, any ice build-up will cause further decrease in the intensity which will cause the light switch to open up and cause the warning light to operate.

Figure 5:
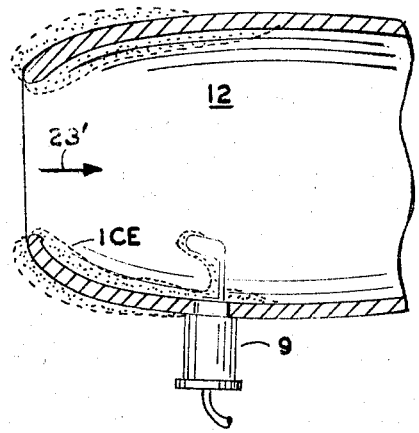
FIGURES 5 and 6 are sectional views illustrating different uses of the invention.

FIGURE 5 shows a probe 9 mounted in an air scoop 12 of a jet or reciprocating engine, the direction of the air being shown by the arrows 23'. If ice, shown by the dotted lines, builds up it will cut off the light path and cause the warning light 29 to be energized.

Figure 6:
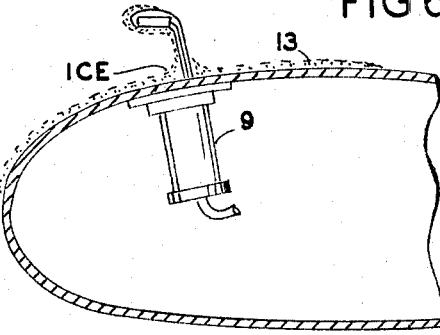

FIGURE 6 shows an embodiment of the invention mounted to detect icing on the wings. The probe 9 is mounted on the inside of the forward edge of the wing and extending through. As the ice builds up, as shown by the dotted lines, the light path of the probe will be cut off and the warning light 29 will be energized.

Figure 7:
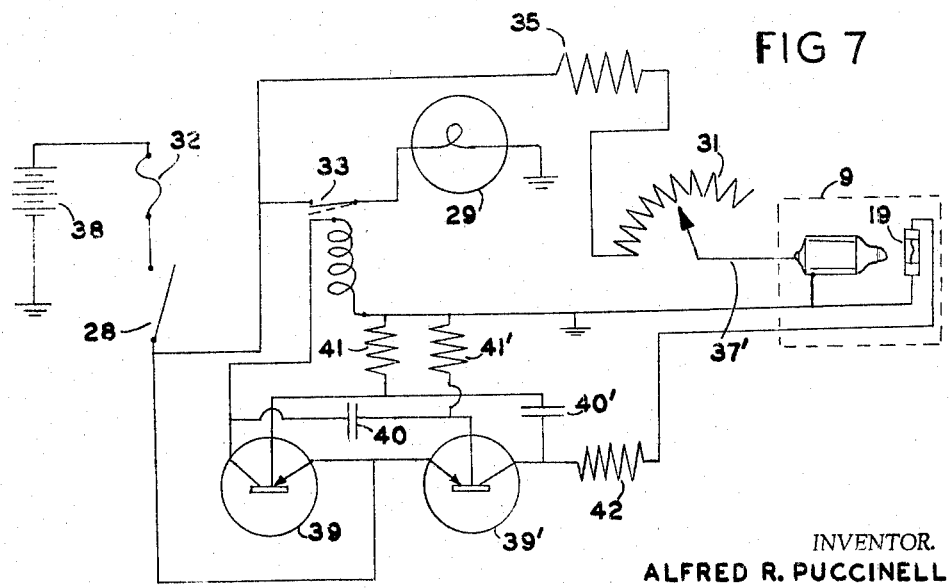
FIGURE 7 is a schematic circuit diagram of a modified automatic circuit.

The circuit of FIGURE 7, is the same as that of FIGURE 3A except in place of the pushbutton there is incorporated a vibrator flip-flop circuit to provide a continuously interrupted D.C. current to the light switch and allow for automatic ice warning. This comprises the transistors 39 and 39', condensers 40 and 40' and resistors 41 and 41'. The output of the circuit is connected through the resistor 42 to the light sensitive switch 19. The operation of the FIGURE 7 circuit is the same as that of FIGURE 3A except for the pushbutton.

The pulsed D.C. current continuously interrupts and "unlatches," the circuit through the light switch, thus allowing the absence of light to break the circuit. The flip-flop circuit will not cause light 29 to flicker because the relay does not react as fast as the flip-flop which is approximately 300 cycles/sec.

Mechanical vibrator or solid state switching devices may also be used in place of the transistorized flip-flop circuit mentioned above, to produce the pulsating D.C. current. If A.C. current is available unlatching of the light switch will occur continuously.

Many modifications may be made by those who desire to practice the invention without departing from the scope thereof which is defined by the following claims:

I claim:
1. Carburetor ice detecting means comprising,
   a unitary assembly adapted to be mounted from the outside through a tapped hole in a wall of said carburetor,
   said unitary assembly comprising,
   a body member having external threads,
   a radiation source mounted in said body member,
   a radiation detector adapted to be mounted on the radiation axis of said source,
   said assembly including extension member means fixedly connected to the body member,
   said extension member extending generally parallel to the radiation axis between said source and said detector,
   said detector being mounted on said extension member and along said radiation axis,
   said detector being mounted in predetermined space relation to said radiation source with said detector in the airstream of said carburetor whereby the space relationship of said assembly may be preset and said assembly installed as a unit and whereby formation of ice on said detector reduces radiation to said detector and causes said detector to activate warning means.
2. Apparatus as in claim 1 having warning means responsive to said detector.
3. Apparatus as in claim 1 wherein said radiation source is a light source.
4. Apparatus as in claim 3 wherein said detector is a light activated electrical switch.
5. Apparatus as in claim 4 wherein said detector is a light activated controlled rectifier.
6. Apparatus as in claim 1 wherein said detector faces both said source and said airstream.
7. Apparatus as in claim 1 having means to vary the sensitivity of the system to accommodate different icing conditions including means to vary the radiation intensity.
8. Surface ice detecting means comprising,
   a unitary assembly adapted to be mounted through a hole in a solid surface wall,
   said unitary assembly comprising,
   a body member,
   radiation source means,
   radiation detector means,
   said assembly including extension member means fixedly connected to the body member,
   said extension member extending generally parallel to the radiation axis between said source and said detector,
   one of said radiation means being mounted on said extension member and along said radiation axis and the other of said radiation means being mounted in said body member,
   means to mount said detector means in predetermined space relation to said radiation source means with one of said radiation means in the airstream over said surface so that said assembly may be preset and installed on a unit whereby formation of ice on said radiation means reduces radiation to said detector and causes said detector to activate warning means.

References Cited by the Examiner
UNITED STATES PATENTS

| 2,446,885 | 8/1948 | Rollefson | 340—234 |
| 2,480,846 | 9/1949 | Friedman et al. | 340—234 X |
| 2,763,853 | 9/1956 | Grant | 340—237 |
| 3,045,223 | 7/1962 | Kapany et al. | 340—234 |
| 3,103,003 | 9/1963 | Roberts | 340—214 X |

NEIL C. READ, *Primary Examiner.*

STEPHEN W. CAPELLI, *Examiner.*

R. ANGUS, D. YUSKO, *Assistant Examiners.*